United States Patent [19]

Tajima

[11] Patent Number: 5,084,889
[45] Date of Patent: Jan. 28, 1992

[54] LASER MEDIUM FOR USE IN A SLAB LASER

[75] Inventor: Hidemi Tajima, Hamura, Japan

[73] Assignee: Hoya Corporation, Tokyo, Japan

[21] Appl. No.: 630,852

[22] Filed: Dec. 20, 1990

[30] Foreign Application Priority Data

Dec. 20, 1989 [JP] Japan ............... 1-330678

[51] Int. Cl.⁵ ............................. H01S 3/14
[52] U.S. Cl. ........................ 372/39; 372/66; 372/73; 372/71
[58] Field of Search .......... 372/39, 66, 92, 93, 372/71, 73, 41

[56] References Cited

U.S. PATENT DOCUMENTS 4,839,902  6/1989  Guch, Jr. ................ 372/72

Primary Examiner—Léon Scott, Jr.
Attorney, Agent, or Firm—Oliff & Berridge

[57] ABSTRACT

A laser medium for use in a slab laser having a light absorbing member provided in a region, wich is deviated from a zigzag path to be followed by a laser beam to be extracted therefrom and thus the laser beam does not pass through. Thereby, parasitic oscillation can be effectively suppressed, and laser oscillation and light amplification can be performed for a long period of time.

8 Claims, 5 Drawing Sheets

LASER MEDIUM FOR USE IN A SLAB LASER

BACKGROUND OF THE INVENTION

1. Field of the Invention

This invention generally relates to a laser medium and more particularly to a laser medium for use in a slab laser (hereunder referred to simply as a slab laser medium) which can weaken amplified spontaneous emission (hereinafter abbreviated as ASE) and suppress parasitic oscillation to thereby increase an oscillation efficiency or an amplification efficiency.

2. Description of the Related Art

As a conventional solid state laser medium, is publicly known a slab laser medium which has a slab structure provided with two parallel planes facing each other as reflecting inner surfaces (hereunder referred to simply as reflecting surfaces) as disclosed in, for example, Japanese Patent Application Publication No. 48-15599 Official Gazette. This conventional slab laser medium is used to perform laser oscillation or optical amplification by extracting a laser beam therefrom. Further, in this conventional slab laser medium, the laser beam follows a zigzag path undergoing internal reflection at the alternate reflecting surfaces. Therefore, even if the distance between the reflecting surfaces is short, the optical path followed by the laser beam can be sufficiently long. In other words, even if the laser medium is made thin, a desired path length can be obtained. Thereby, the laser medium can be efficiently cooled. Thus, large pump energy can be supplied to the laser medium. This realizes laser oscillation providing a large laser output.

Further, in general, where a thermal gradient is presented within a laser medium, thermal lensing and thermal birefringence occurring due to thermally induced distortion and stress cause phase differences among laser beams to be extracted. This results in degradation of beam quality. However, in case of this conventional slab laser medium, the laser beam goes along the zigzag path between the reflecting surfaces as described above. Thus, the laser beam equally and repeatedly travels obliquely to a transverse direction, in which the thermal gradient is presented, perpendicular to the two reflecting surfaces. Consequently, the phase difference due to unevenness of refractive index in the laser medium, which is caused by the thermal lensing and the thermal birefringence, is substantially cancelled, and further a laser beam with relatively good beam quality can be obtained.

As a conventional laser medium obtained by making better use of the characteristic of this slab laser medium to improve beam quality, is publicly known what is called a composite slab type laser medium proposed by J. L. Emmett et al (see *The Potential of High-Average-Power Solid State Lasers* UCRL-53571, Lawrence Livermore National Laboratory, California, 1984). This composite slab type laser medium includes a laser activating material only in a specific region between the reflecting surfaces to decrease the thermal gradient. Generally, in a slab laser medium, temperature is high in a central portion in the transverse direction between the two reflecting surfaces. Further, the closer to end portions (i.e., to the reflecting surfaces) a portion, the lower temperature. Thus, by removing the laser activating material from the central portion, generation of heat therein is prevented. Moreover, by making laser pumping regions of the end portions extremely thin, the thermal gradient in the transverse direction is made to be very small.

This slab laser medium, however, has encountered problems of the ASE and a parasitic oscillation caused in the inside thereof, which are obstacles to obtain a larger laser output. Incidentally, the ASE is an emitted light, which is stimulated and amplified by fluorescence in a laser medium and attenuates energy stored prior to normal laser oscillation and optical amplification. Further, the parasitic oscillation is a phenomenon that in a laser medium, a part of laser beams do not go along a normal optical path to be followed by a laser beam which resonates in the laser medium (hereunder sometimes referred to as a resonant optical path) but perform a harmful oscillation by, for instance, going back and forth many times between the reflecting surfaces in the transverse direction. Further, if the parasitic oscillation frequently occurs, the efficiency of effective laser oscillation and the efficiency of the amplification are decreased and as a result a large laser output cannot be obtained.

A known technique of suppressing this parasitic oscillation is what is called a segmented spacer (see "New Slab and Solid-State Laser Technology and Application", SPIE., Vol. 736, p. 38, 1987). According to this technique, a gasket member made of rubber and so on is put into contact with an outer surface of each of parts, at which a laser beam is not reflected, of the parallel planes in order to prevent conditions of total internal reflection from holding. As described above, in the slab laser medium, a laser beam to be extracted therefrom (hereunder sometimes referred to simply as an extraction beam) goes along a zigzag path undergoing reflection at the alternate reflecting surfaces. As a consequence, each reflecting surface is scattered with parts of a region (hereinafter referred to as a non-path region), through which the extraction beam does not pass. Therefore, the efficiency of oscillation is not decreased in case where the conditions of total reflection of the laser beam are made not to hold for parts of the non-path region. Moreover, by preventing the conditions of total reflection from holding for parts of the non-path region, reflection of light generated by the ASE or the parasitic oscillation having reached the parts of the non-path region can be prevented, Furthermore, attenuation of the stored energy can be suppressed.

The segmented spacer is developed on the basis of an idea that reflection of a laser beam at parts of the non-path region is restrained by making the conditions of total reflection from holding for the parts of the non-path region. Thus, the gasket member is used as a member for making the conditions of total reflection from holding.

However, the results of the experiments made by inventors of the present invention reveals that the gasket member is very easily deteriorated by iteration of the laser oscillation and optical amplification. From an investigation, it is found that the cause of this is a phenomenon that the gasket member is not also heated by heat conducted from the laser medium but also absorbs pumping light and light emitted due to parasitic oscillation (hereinafter referred to as parasitic oscillation light) and generates heat and thus temperature of the gasket member is liable to rise to a permissible temperature and higher. Especially, this phenomenon is conspicuously presented in case that an air-cooling method with low cooling efficiency is employed for cooling the laser medium.

The present invention is intended to obviate the above described drawbacks of the conventional slab laser.

It is accordingly an object of the present invention to provide a slab laser which can effectively suppress parasitic oscillation and stably perform laser oscillation and light amplification for a long period of time.

SUMMARY OF THE INVENTION

To achieve the foregoing object and in accordance with a first aspect of the present invention, there is provided a slab laser medium having a slab structure provided with two parallel planes facing each other as reflecting surfaces and being used to perform laser oscillation or optical amplification by extracting a laser beam, which follows a zigzag path undergoing internal reflection at the alternate reflecting surfaces therein, therefrom, wherein at least a part of a region, which is deviated from the zigzag path and the laser beam to be extracted therefrom does not pass through, is made up of a light absorbing member.

Thus, the light absorbing member absorbs ASE, parasitic oscillation light or fluorescence. Thereby, the parasitic oscillation and so forth can be effectively suppressed.

Further, in accordance with a second aspect of the present invention, there is provided a slab laser medium having a slab structure provided with two parallel planes facing each other as reflecting surfaces and being used to perform laser oscillation or optical amplification by extracting a laser beam, which follows a zigzag path undergoing internal reflection at the alternate reflecting surfaces therein, therefrom, wherein a light absorbing member is fixedly mounted on an outer surface of at least a part of a region which is deviated from the zigzag path and the laser beam to be extracted therefrom does not pass through, of each of the two parallel planes, and wherein the light absorbing member is made of materials having an optical property that conditions of total internal reflection at a part of an inner surface of each of the two parallel planes corresponding to a part of the outer surface thereof, on which the light absorbing member is fixedly mounted, become unsatisfied when the light absorbing member is put into contact with the part of the outer surface and thermal properties similar to thermal properties of materials composing the slab laser medium other than the light absorbing member.

Thus, the conditions of total reflection of the laser beam to be extracted are not satisfied at the part of the inner surface of each of the two parallel planes corresponding to the part of the outer surface thereof, on which the light absorbing member is fixedly mounted. Consequently, ASE, parasitic oscillation light or fluorescence, which reach this part of the inner surface of each of the two parallel planes corresponding to the part of the outer surface thereof, on which the light absorbing member is fixedly mounted, are not reflected thereat but absorbed by the light absorbing member. Thereby, the parasitic oscillation and so forth can be effectively suppressed. Moreover, because the light absorbing member has the thermal properties similar to those of materials composing the slab laser medium other than the light absorbing member, the light absorbing member has a good thermal-resisting property. Thus, there is substantially no possibility of occurring thermal distortion due to the difference in thermal expansion among parts of the laser medium.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, preferred embodiments of the present invention will be described in detail by referring to the accompanying drawings.

Figure 1:
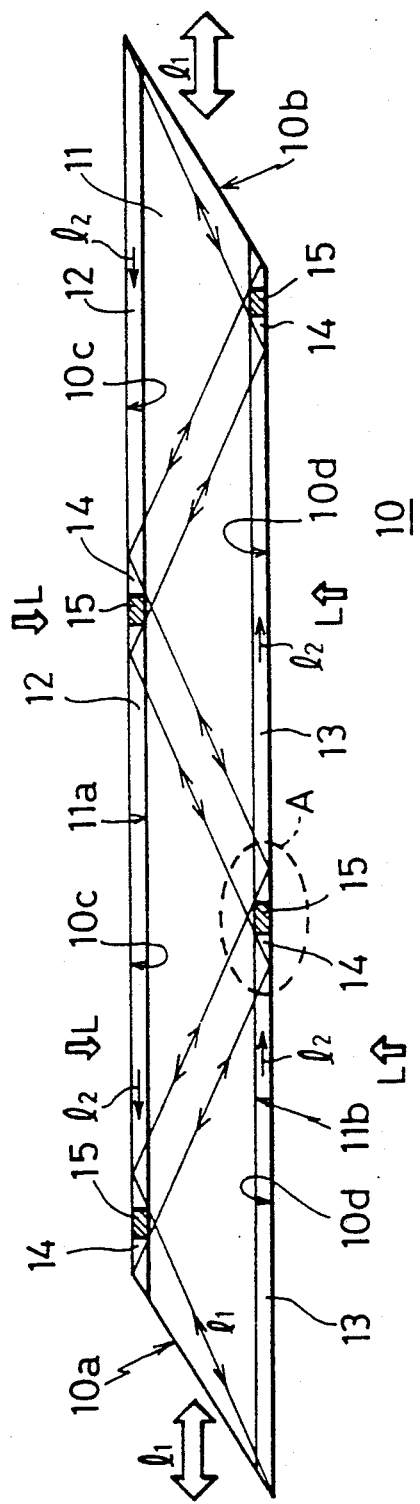
FIG. 1 is a sectional view of a first embodiment of the present invention.
Figure 2:
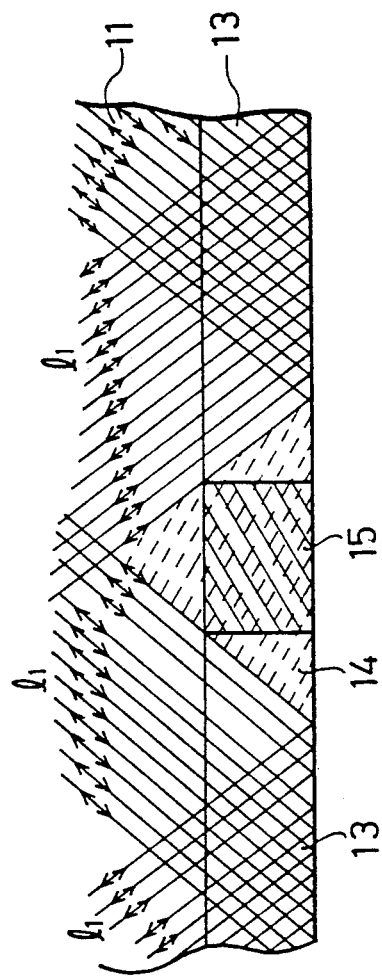
FIG. 2 is an enlarged sectional view of a part A of FIG. 1.

First, by referring to FIGS. 1 and 2, a first embodiment of the present invention will be described in detail hereinbelow. FIG. 1 is a sectional view of a first embodiment (i.e., a first slab laser medium) of the present invention. Further, FIG. 2 is an enlarged sectional view of a part A indicated by a dashed circle in FIG. 1. Incidentally, this embodiment is an example of application of the first aspect of the present invention to what is called a composite slab type laser medium.

In these figures, reference numeral 10 designates a laser medium; 11 a substrate portion; 12 and 13 glass substrate portions made of glass (hereunder referred to as laser glass plate portions); 14 a non-path region portion; and 15 a light absorbing member.

The substrate portion 11 is a plate-like portion made of transparent phosphate glass, which contains no laser activating material, and is approximately 6 millimeters (mm) in thickness, 25 mm in width and 80 mm in length. Further, a refractive index $n_d$ and a thermal expansion coefficient $\alpha$ of the glass composing the substrate portion 11 are 1.549 and $99 \times 10^{-7}/°C$., respectively.

As illustrated in FIG. 1, the laser glass plate portions 12, ..., 12 and 13, ..., 13 and the light absorbing members 15, ..., 15 are fixed to surfaces 11a and 11b of the substrate portions 11, respectively.

Further, the laser glass plate portions 12, ..., 12 and 13, ..., 13 are plate-like portions each made of phosphate glass containing $Nd^{3+}$ ions of $1 \times 10^{21}$/c.c. as laser activating material, and is 1 mm or so in thickness. Furthermore, a refractive index $n_d$ and a thermal expansion coefficient $\alpha$ of the glass composing the laser glass plate portions 12, ..., 12 and 13, ..., 13 are 1.549 and $100 \times 10^{-7}/°C$., respectively.

When irradiated with predetermined pump light L, these laser glass plate portions 12, ..., 12 and 13, ..., 13 perform stimulated emission of light of the wavelength is 1.06 micrometer (μm). Further, when the laser glass plate portions are positioned in a predetermined resonant optical path, laser oscillation occurs at wavelength of 1.06 μm. Moreover, when a laser beam passes through the laser glass plate portion, light amplification is effected.

Furthermore, the light absorbing members 15, ..., 15 are band-like portions each made of phosphate glass including 1% $Fe^{2+}$ ions which absorb light having wavelength of 1.06 μm, and is 1 mm or so in thickness. Incidentally, the light absorbing member 15 is obtained by first adding 2.3% $Fe_3O_4$ to phosphate glass and next dissolving the phosphate glass in a reducing atmosphere. In passing, the width of each of the light absorbing members 15, ..., 15 is suitably determined corresponding to the non-path region portions 14, ..., 14.

Moreover, surfaces of the laser glass plate portions 12, ..., 12 and 13, ..., 13 and light absorbing members 15, ..., 15 are abraded like a mirror. Further, the abraded surfaces of the laser glass plate portions 12, ..., 12 and 13, ..., 13 and the light absorbing members 15, ..., 15 are alternately arranged and are pushed and welded to the surfaces 11a and 11b of the substrate portion 11 as illustrated in FIG. 1. Namely, the entire surfaces 11a and 11b facing each other in the transverse direction are covered by the laser glass plate portions 12, ..., 12 and 13, ..., 13 and the light absorbing members 15, ..., 15. In this case, the light absorbing members 15, ..., 15 are placed at the positions of the non-path region portions 14, ..., 14.

Incidentally, the laser glass plate portions 12, ..., 12 and 13, ..., 13 and the light absorbing members 15, ..., 15 are made of the phosphate glass material of which the refractive index is different from that of the phosphate glass material of the substrate portion 11 by a quantity equal to or less than 0.03 and the thermal expansion coefficient is different from that of the phosphate glass material of the substrate portion 11 by a quantity having an absolute value equal to or less than $5 \times 10^{-7}/°C$. in such a manner to prevent occurrence of Fresnel reflection and thermal distortion as far as possible.

In addition, each of an incident end surface 10a and an exit end surface 10b, which faces each other in a longitudinal direction, of the laser medium 10 is formed to be inclined at a predetermined angle away from the longitudinal direction and is further abraded like a mirror. Incidentally, the angle is set such that a laser beam $l_1$, which enters and exits from the laser medium in the longitudinal direction, meets Brewster's condition. Thereby, total reflection of only polarized light can be effected at the alternate reflecting surfaces 10c and 10d.

Hereunder, will be considered effects obtained in case where the laser having the above described arrangement is Q-switched. When mirrors for effecting laser resonance are placed at the both ends of the laser medium 10 in the longitudinal direction and further the laser medium 10 is irradiated with pump light L from a pump source (not shown), a laser beam which resonates in the laser medium (hereunder sometimes referrred to as laser resonance light) $l_1$ is generated between the mirror and the laser medium. The laser resonance light $l_1$ follows a zigzag path undergoing total reflection at the alternate reflecting surfaces 10c and 10d facing each other in the transverse direction. In this case, a region portion 14 deviated from the zigzag path (i.e., a non-path region portion) is formed in the laser medium 10. Namely, the non-path region portion 14 is a portion through which the laser resonance light $l_1$ does not pass. As above described, the light reflecting member 15 is placed in the non-path region portion 14. Thus, ASE or parasitic oscillation light generated in the laser glass plate portions 12 and 13 and traveling from left to right, and vice versa, as viewed in FIG. 1, can be effectively absorbed by the light absorbing member 15. Thereby, ASE can be weakened and parasitic oscillation can be suppressed, and oscillation with good efficiency can be achieved. In passing, where the laser medium 10 is used as a light amplifier, ASE can be weakened and parasitic oscillation can be suppressed, and light amplification with good efficiency can be achieved.

Figure 3:
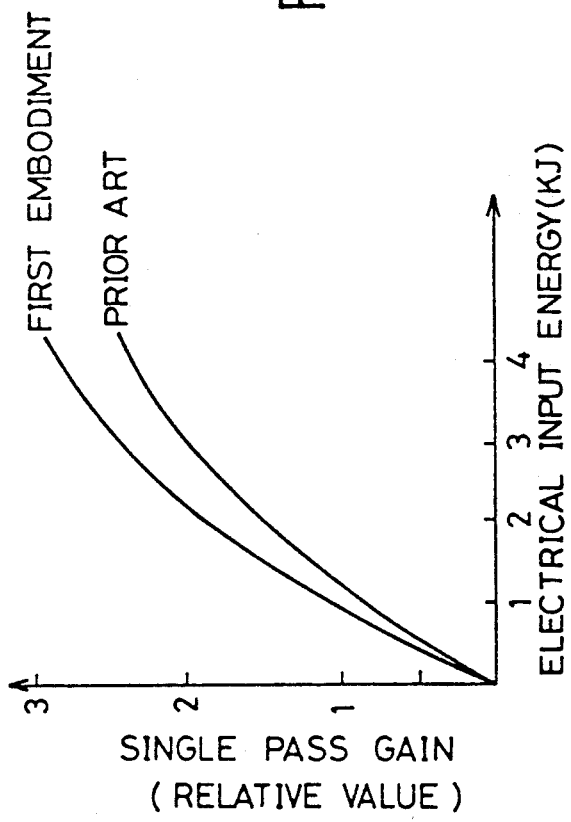
FIG. 3 is a graph for illustrating characteristics of the first embodiment of FIG. 1.

Referring next to FIG. 3, there is illustrated a graph showing results of measurement of a single pass gain (=optical path length × a gain) of the laser medium 10 of this embodiment and of a single pass gain of a prior art composite slab type laser medium which has the same structure as the laser medium of this embodiment does except being provided with no light absorbing members. In FIG. 3, the vertical axis represents single pass gains expressed by relative values; the horizontal axis electrical input energy (i.e., input pump energy) expressed in kilojoule (kJ).

Figure 4:
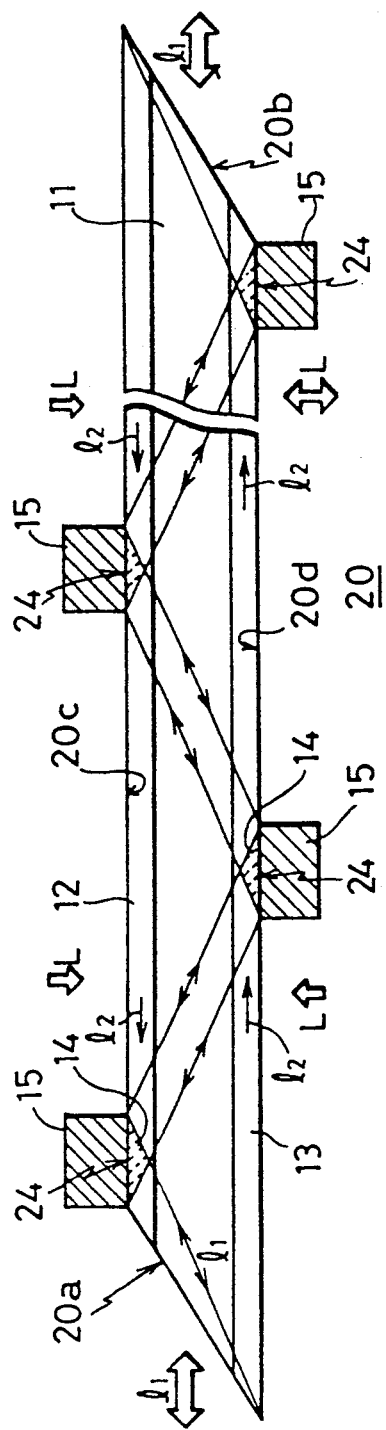
FIG. 4 is a partially cutaway view of a second embodiment of the present invention.

Next, a second embodiment of the present invention will be described in detail hereinbelow. FIG. 4 is a partially cutaway view of the second embodiment (i.e., a second slab laser medium) of the present invention. Incidentally, this embodiment is an example of application of the second aspect of the present invention to what is called a composite slab type laser medium.

In this embodiment, the laser medium 20 is constructed by replacing the light absorbing members 15 of the laser medium 10 of the first embodiment with the laser glass plate portions 12 and 13 and further welding the light absorbing members 15 to the outer surfaces 24, ..., 24 of the non-path region portions 14, ..., 14. The other composing elements of this embodiment are the same as the corresponding elements of the first embodiment. Therefore, composing elements of the second embodiment, which are the same as the corresponding elements of the first embodiment, are designated by the same reference numerals as used to the corresponding elements of the first embodiment. Further, detailed descriptions of the composing elements of the second embodiment, which are the same as the corresponding elements of the first embodiment are omitted herein for brevity of description. Incidentally, reference character 20a designates an incident end surface of the laser medium 20; 20b an exit end surface thereof; and 20c and 20d reflecting surfaces thereof. Further, in the second embodiment, doped phosphate glass containing approximately 5 to 10% $Sm^{3+}$ ions, which are added thereto by doping and absorbs light having wavelength of 1.06 μm, is employed as the light absorbing member 15. In passing, a refractive index $n_d$ and a thermal expansion coefficient $\alpha$ of the glass composing the light absorbing member 15, ... are 1.542 and $100 \times 10^{-7}/°C$., respectively. Thus, the difference in refractive index of the composing glass material between the light absorbing members 15 and the laser glass plate portions 12 and 13 is very small, i.e., equal to or less than approximately 0.01. In addition, the laser medium 20 is 10 mm in thickness and 30 mm in width. Further, the substrate portion 11 is 6 mm in thickness. Moreover, the number of times of total reflection which an extraction beam undergoes in the laser medium, is 6.

As described above, in the laser medium 20 of the second embodiment, the light absorbing members 15, which are made of the phosphate glass having the refractive index very slightly different in magnitude from that of the phosphate glass composing the laser glass plate portions, are welded onto the outer surfaces 24 of the non-path region portions 14. Therefore, at parts of the surface to which the light absorbing members are welded, the conditions of total reflection is not satisfied. Accordingly, parasitic oscillation light $l_2$, which is generated in the laser glass plate portions 12 and 13 and has wavelength of 1.06 μm and reaches the parts of the welded surface, is not reflected by the outer surface 24 and is incident on the light reflecting member 15 and further is absorbed therein. Thereby, can be obtained technical advantage which is similar to the technical advantage of the first embodiment. Moreover, the difference in thermal expansion coefficient of the composing glass material between the light absorbing members and the laser glass plate portions is extremely small. Therefore, there is substantially no possibility of occurrence of thermal distortion owing to the difference in thermal expansion coefficient of the composing glass material between the light absorbing members and the laser glass plate portions. Additionally, this embodiment excels in thermal resistance.

In passing, as described above, this embodiment is an example of application of the second aspect of the present invention to what is called a composite slab type laser medium. It is, however, apparent that the second aspect of the present invention can be applied to an ordinary slab laser medium.

Figure 5:
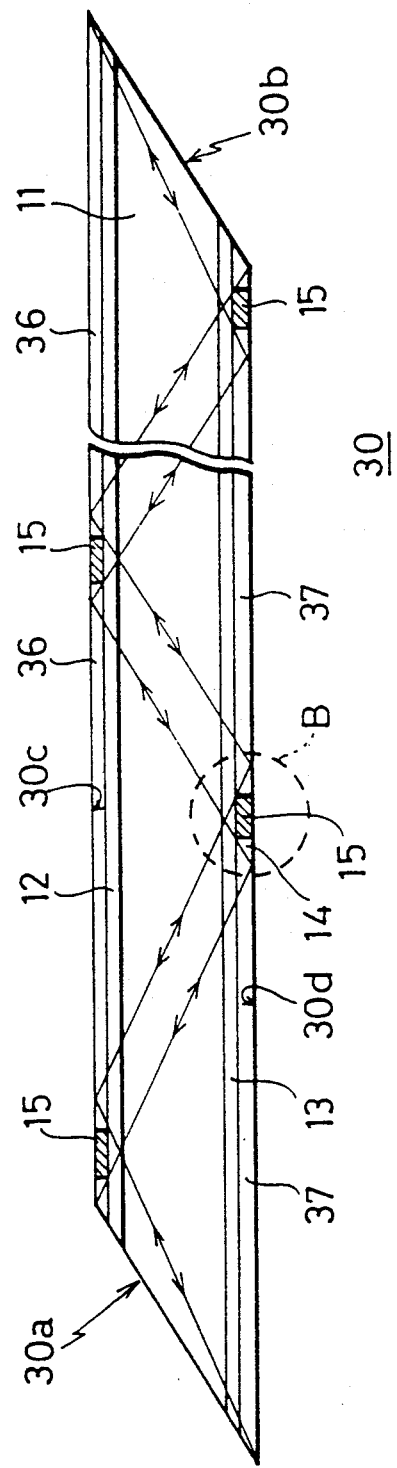
FIG. 5 is a partially cutaway view of a third embodiment of the present invention.
Figure 6:
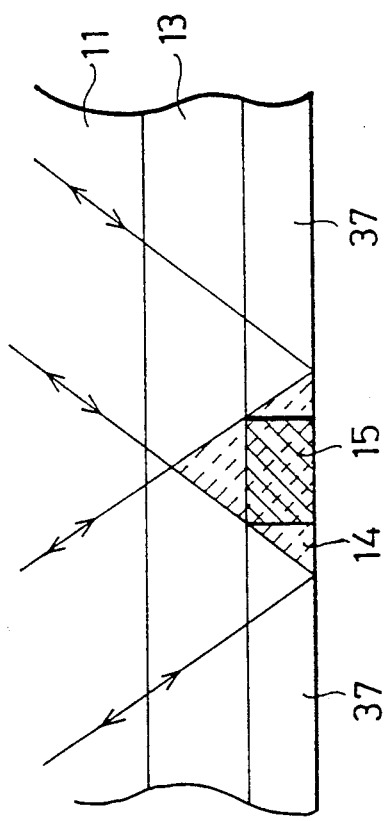
FIG. 6 is an enlarged sectional view of a part B of FIG. 5.

Hereinafter, a third embodiment of the present invention will be described in detail. FIG. 5 is a partially cutaway view of the third embodiment of the present invention. Further, FIG. 6 is an enlarged sectional view of a part B of FIG. 5. Incidentally, this embodiment is an example of application of the first aspect of the present invention to what is called a composite slab type laser medium.

In this embodiment, the laser medium 30 is constructed by welding water-resisting glass plates 36, ..., 36 and 37, ..., 37 to portions other than the portions, to which the light absorbing members 15 are fixed, of the reflecting surfaces 20c and 20d of the laser medium 20 of the second embodiment. With such an arrangement of the water-resisting glass plates 36, ..., 36 and 37, ..., 37, laser glass plate portions 12, ..., 12 and 13, ..., 13 made of phosphate glass (containing Nd ions), which is poor in water resisting property, can be protected from cooling water. Consequently, water-cooling can be performed. Incidentally, in FIG. 5, reference character 30a designates an incident end surface of the laser medium 30; 30b an exit end surface thereof; and 30c and 30d reflecting surfaces thereof. Further, in the third embodiment, the water-resisting glass plates 36 and 37 are made of silicate glass of which the refractive index $n_d$ and the thermal expansion coefficient $\alpha$ are 1.555 and $101 \times 10^{-7}/°C.$, respectively. Moreover, water-resisting glass obtained by making the silicate glass contain 10% $Cu^{2+}$ ions which absorb parasitic oscillation light having wavelength of 1.06 μm is employed as the light absorbing members 15. Incidentally, the refractive index $n_d$ and the thermal expansion coefficient $\alpha$ of this water-resist glass are 1.555 and $101 \times 10^{-7}/°C.$, respectively. Furthermore, the water resistance of the water-resisting glass of the composing elements 15, 36 and 37 is measured by effecting what is called a powder method by using $H_2O$ at 100° C. for one hour. As the result of the measurement, 0.03% of the weight of water is reduced. Further, fine abrasion is performed on the surfaces of the water-resisting glass of the composing elements 15, 36 and 37 with the result that the water-resisting glass is formed in such a manner to be 0.2 mm or so in thickness. In addition, the laser medium 30 is 10 mm in thickness and 30 mm in width. Furthermore, the substrate portion 11 is 5.6 mm in thickness and 165 mm in length. Moreover, the number of times of total reflection which an extraction beam undergoes in the laser medium, is 6.

By this embodiment, can be obtained technical advantage which is similar to the technical advantage of the first and second embodiments. Moreover, dissolution of the laser glass plate portions due to cooling water can be suppressed. Thereby, laser oscillation providing a higher laser output can be effected, or higher optical amplification can be achieved.

Figure 7:
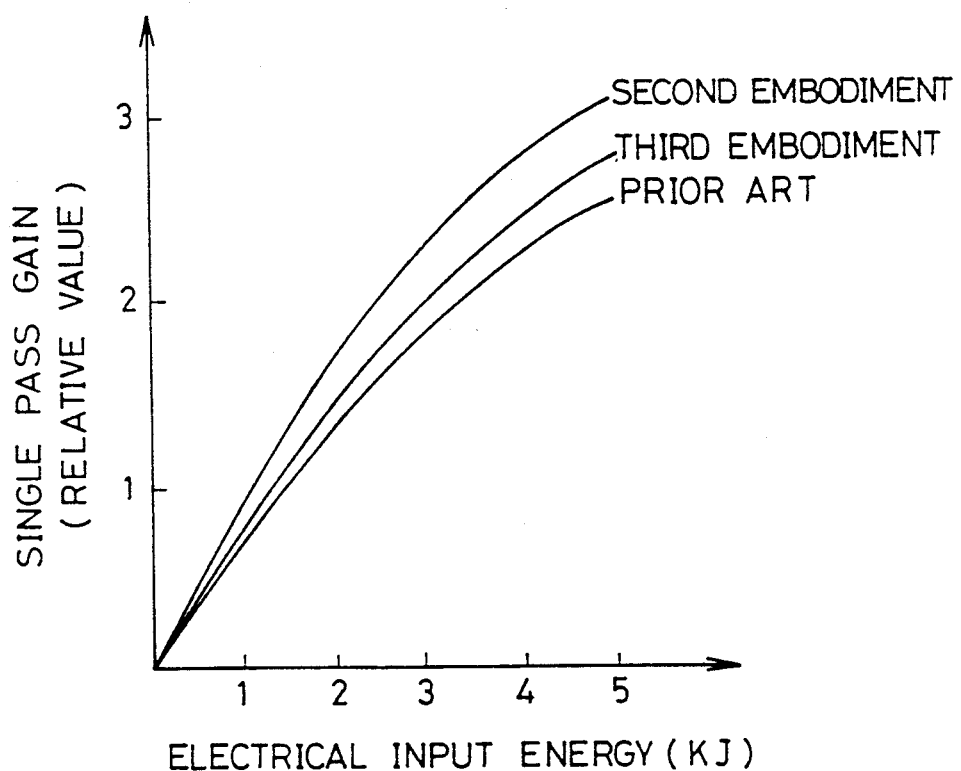
FIG. 7 is a graph for illustrating characteristics of the second and third embodiments of FIGS. 5 and 6.

Referring further to FIG. 7, there is illustrated a graph showing results of measurement of single pass gains of the laser medium 20 and 30 of the second and third embodiments and of a single pass gain of a prior art composite slab type laser medium which has the same structure as the laser medium of the second embodiment does except being provided with no light absorbing members. In FIG. 7, the vertical axis represents single pass gains expressed by relative values; the horizontal axis electrical input energy (i.e., input pump energy) expressed in kJ.

Figure 8:
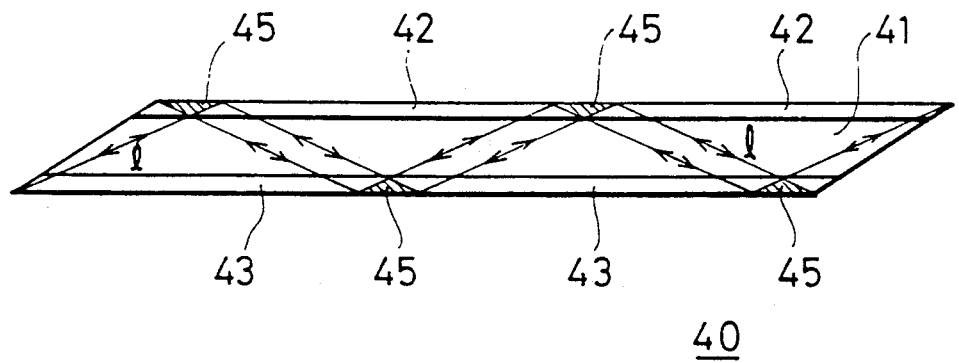
FIG. 8 is a sectional view of a fourth embodiment of the present invention.
Figure 9:
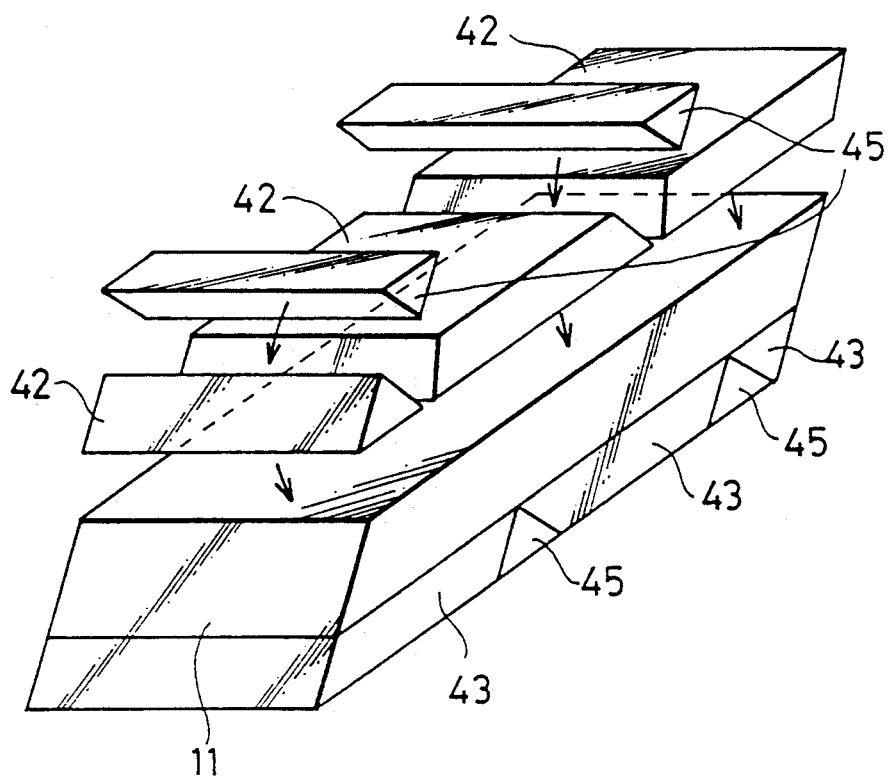
FIG. 9 is an exploded perspective view of the fourth embodiment of FIG. 8.

Next, a fourth embodiment of the present invention will be described in detail hereinbelow. FIG. 8 is a sectional view of the fourth embodiment of the present invention and FIG. 9 is an exploded perspective view of the fourth embodiment of FIG. 8. Incidentally, this embodiment is an example of application of the first aspect of the present invention to an ordinary slab laser medium. Namely, in this embodiment, portions corresponding to the non-path region portions 14 of each of the first to third embodiments are comprised of light absorbing members, and the other portions thereof are made up of glass members containing laser activating materials.

In FIGS. 8 and 9, reference numeral 40 designates a laser medium; 41 a substrate portion; 42 and 43 reflecting plate portions; and 45 a light absorbing member.

The substrate portion 41 has a shape which is substantially the same as the shape of the substrate portions 11 of each of the first to third embodiments but different in composing materials from the substrate 11. Namely, the substrate portion 41 is made up of phosphate glass members, which contain $Nd^{+3}$ ions as laser activating material.

Further, the light absorbing member 45 is substantially shaped like a triangular prism similarly as in cases of the non-path region portions of the first to third embodiments. Furthermore, the light absorbing member 45 is made of phosphate glass including ions which absorb light having wavelength of 1.06 μm. In addition, surfaces of the light absorbing member 45 is abraded like a mirror.

Moreover, as is seen from FIG. 8, each of the reflecting plate portions 42 and 43 has inclined surfaces to be used as contact surfaces when the portions 42 and 43 and the light absorbing member 45 are alternately combined with each other on the same plane in such a fashion to make a plate-like body. In passing, the surface of the inclined plane is abraded like a mirror. Additionally, the substrate portion 41 and the reflecting plate portions 42 and 43 are made of the same glass material.

As illustrated in FIG. 9, the reflecting plate portions 42 and 43 are welded onto the two surfaces of the substrate portion 41 facing each other in the transverse direction, respectively. Subsequently, the light absorbing member 45 are fitted and further are welded onto adjacent two of the reflecting plate portions 42, . . . , 42 and 43, . . . , 43. Thus, is obtained the laser medium 40 in which the non-path region portions deviated from the zigzag path are made up of the light absorbing members 45.

Thereby, in case of the fourth embodiment, parasitic oscillation can be suppressed by actions similar to the actions in case of the first to third embodiments. Moreover, laser oscillation providing a higher laser output can be effected, or higher optical amplification can be achieved.

While preferred embodiments of the present invention have been described above, it is to be understood that the present invention is not limited thereto. For example, $Pr^{3+}$, $Dy^{3+}$ and $V^{3+}$ ions may be employed as ions contained in the light absorbing member for absorbing parasitic oscillation light. Further, the above described embodiments can be used for effecting laser oscillation or optical amplification of laser light having wavelength other than 1.06 μm. In addition, the composing elements of the laser medium may be made of a crystalline material instead of a glass material.

Further, it is to be understood that other modifications will be apparent to those skilled in the art without departing from the spirit of the invention.

The scope of the present invention, therefore, is to be determined solely by the appended claims.

What is claimed is:

1. A laser medium for use in a slab laser having a slab structure provided with two spaced, parallel substrates, each said substrate having a plane, said planes being parallel planes facing each other as reflecting surfaces and being used to perform laser oscillation or optical amplification by extracting a laser beam, the laser beam following a zigzag path undergoing internal reflection at alternating reflecting surfaces of the two parallel planes, said laser medium further comprising:

a light absorbing member which forms at least a part of a region of said substrates, the light absorbing member deviating from the zigzag path such that the laser beam to be extracted therefrom does not pass therethrough.

2. A laser member for use in a slab laser as set forth in claim 1 which further comprises:

a layer of a first type; and
two layers of a second type holding said layer of the first type therebetween, said two layers containing a laser activating material, wherein said layer of the first type is a member that contains a quantity of laser activating material less than that of the laser activating material contained in said layers of the second type, and said layers of the second type having sides opposed to boundary surfaces between said layer of the first type and said layers of the second type said sides being said two parallel planes facing each other.

3. A laser medium for use in a slab laser as set forth in claim 1, wherein said light absorbing member is made of a first material, said first material being provided in elements of the laser medium other than said light absorbing member, said light absorbing member further containing a second material, which absorbs laser light emitted from a laser activating material.

4. A laser medium for use in a slab laser as set forth in claim 3, wherein said first material is glass material, and said light absorbing member is made of said first glass material, said first glass material further containing ions which absorb laser light emitted from the laser activating material.

5. A laser medium for use in a slab laser as set forth in claim 4, wherein the ions to be contained in said light absorption member are at least one of $Nd^{3+}$, $Sm^3$, $Cu^{+2}$, $Pr^{+3}$, $Dy^{+3}$ and $V^{+3}$ ions.

6. A laser medium for use in a slab laser having a slab structure provided with two spaced, parallel substrates, each said substrate having a plane, said planes being parallel planes facing each other as reflecting surfaces and being used to perform laser oscillation or optical amplification by extracting a laser beam, the laser beam following a zigzag path undergoing internal reflection at alternating reflecting surfaces of the two parallel planes, said laser medium further comprising:

a light absorbing member fixedly mounted on an outer surface of at least a part of a region of said substrates which deviates from the zigzag path such that the laser beam to be extracted therefrom does not pass therethrough, said light absorbing member being formed of materials having an optical property wherein conditions of total internal reflection at a part of an inner surface of each of the two substrates corresponding to a part of the outer surface thereof, on which said light absorbing member is fixedly mounted, become unsatisfied when said light absorbing member contacts the outer surface, said light absorbing member having thermal properties similar to thermal properties of materials composing said laser medium other than said light absorbing member.

7. A laser medium for use in a slab laser as set forth in claim 6, which further comprises:

a layer of the first type, and
two layers of a second type holding said layer of the first type therebetween, said two layers containing a laser activating material, wherein said layer of the first type is a member that contains a quantity of laser activating material less than that of the laser activating material contained in said layers of the second type, and said layers of the second type having sides opposed to boundary surfaces between said layer of the first type and said layers of the second type, said sides being said two parallel planes facing each other.

8. A laser medium for use in a slab laser as set forth in claim 6, wherein said light absorbing member is made of a first material, said first material being provided in elements of the laser medium other than said light absorbing member, said light absorbing member further containing a second material, which absorbs laser light emitted from a laser activating material.

* * * * *